(12) United States Patent
Thwaites et al.

(10) Patent No.: US 7,133,913 B2
(45) Date of Patent: Nov. 7, 2006

(54) INFORMATION ROUTING

(76) Inventors: Jacoby M. Thwaites, 21 Worship Street, London (GB) EC2A 2BH; Bimal Patel, 21 Worship Street, London (GB) EC2A 2BH ( * ) Notice: Subject to any disclaimer, the term of this patent is extended or adjusted under 35 U.S.C. 154(b) by 924 days.

(21) Appl. No.: 09/925,896

(22) Filed: Aug. 9, 2001

(65) Prior Publication Data

US 2002/0023088 A1    Feb. 21, 2002

(30) Foreign Application Priority Data

Aug. 9, 2000    (GB) .................................... 0019625

(51) Int. Cl.
*G06F 15/173* (2006.01)
*G06F 15/16* (2006.01)

(52) U.S. Cl. .................. 709/224; 709/225; 709/231
(58) Field of Classification Search ............... 709/224, 709/225; 719/314
See application file for complete search history.

(56) References Cited

U.S. PATENT DOCUMENTS 4,333,144 A      6/1982    Freedman et al.
6,182,143 B1 *   1/2001    Hastings et al. ............ 709/224
6,202,093 B1 *   3/2001    Bolam et al. ................ 709/225
6,216,173 B1     4/2001    Jones et al.
6,510,429 B1 *   1/2003    Todd .......................... 719/314

FOREIGN PATENT DOCUMENTS

| EP | 0806731 A2 | 1/1997 |
| EP | 0806731 A3 | 1/1997 |
| EP | 0862113 A2 | 2/1998 |
| EP | 1179928 A2 | 8/2001 |
| EP | 1179928 A3 | 8/2001 |

* cited by examiner

*Primary Examiner*—Patrice Winder
(74) *Attorney, Agent, or Firm*—Dergosits & Noah LLP (57) ABSTRACT

The invention is an improved method and apparatus for information routing and sharing in multiple computer networks, which can facilitate automatic integration of diverse network and data systems. In an integrated data network comprising multiple computer systems, distinct information users and sources may each be considered as a block. An information routing layer coupled to each of the blocks provides for the routing of information provided in the form of datasets, which are combinations of field names, types, values and other components. An existing dataset can be provided or an aggregate set can be constructed as required to meet an information request from a block in the integrated data network without programmatic or specified workflow reference to other blocks.

16 Claims, 5 Drawing Sheets

Information Routing, Districts and Blocks

Figure 1 - Information Routing, Districts and Blocks

Figure 2 - Diagram of Example Dataset

Information Router Main Loop

Figure 3 - Example Information Router Main Loop

Forming an Aggregate Set

Figure 4 - Process Steps for Forming an Aggregate Set

CTI Application Stage 1

Figure 5 - CTI Stage 1

CTI Application Stage 2

Figure 6 - CTI Stage 2

Figure 7 - CTI Stage 3

Figure 8 - CTI Stage 4

Figure 9 - New Block

Figure 10 - New Information Request Set Satisfied

INFORMATION ROUTING

TEECHNICAL FIELD

The present invention relates to processes and means by which multiple computers in networked systems are enabled to make available and/or exchange information. The invention is particularly directed at provision of an integrated system for access to and use of information by any one or more of multiple computer systems without requiring specifically programmed responses or requests in or from the distinct systems.

BACKGROUND OF THE INVENTION

Enabling multiple computer systems to work effectively in sharing information and resources accounts for a substantial proportion (possibly 80%) of current work in the integration of computer systems. For example, a system in a retail bank may hold information relating to a customer's account, while quite a different system (such as a telephone switch) may hold more transient information regarding the source of origin of a customer's call. Making these separate systems work together (so as, say, to display the customer's account details on a screen using the telephone caller line ID as a key) presently involves using hardware and software to program each participating system to communicate specifically and directly with each other to achieve the desired result. The problem with this approach is that the complexity of the integration rises rapidly as the number of systems to be integrated increases. Furthermore, the specific programming skills required may become difficult to acquire and retain as individual integrated systems become older or even obsolete.

Attempts to address these problems have led to the development of "Information Brokers" or "Message Oriented Middleware" which enable one system to connect to another, often via an intermediary hub. This offers a considerable improvement because each integrated system requires only to be connected to the hub rather than to each of the other systems involved in the integration. Furthermore, the complexities of ensuring that messages arrive in the correct order at the recipient system, the queuing of messages so that temporary unavailability does not affect the overall integration, and the distribution of messages to multiple "subscribing" systems can all be handled within the message oriented middleware. An example of an existing message queuing system is described in U.S. Pat. No. 4,333,144 entitled "Task communicator for multiple computer system".

One central problem with this approach, however, is that each system, being an "end point" in the integration, needs to be specifically programmed in the light of the operations to be done preceding and subsequent to the transmission of each message or batch of messages between systems. These operations have to be programmed in the light of and with knowledge of the equivalent operations of other integrated end points. As the number of integrated systems increases, this work becomes overwhelmingly complex. Automatic integration—that is, enabling systems of all kinds to work together without the need to explicitly program or re-program each system in every new case is not facilitated in this environment.

BRIEF SUMMARY OF THE INVENTION

The present invention provides an improved method and apparatus for information routing and sharing in multiple computer networks, which can facilitate automatic integration of diverse network and data systems, and users and sources of information.

In one aspect, the invention provides a method of facilitating the exchange and processing of information in and between a plurality of Blocks, wherein each Block is an information-providing or information-processing element in an integrated data network, and further wherein at least one Block has a requirement for receiving information from one or more other Blocks. The method includes:

(1) providing an Information Routing Layer to manage the exchange of information between Blocks and the fulfilment of a specific Information Request from a Block having a requirement to receive information; wherein (a) each Block which can provide or process information on the network is registered at the Information Routing Layer; (b) each unit of information is handled in the Information Routing Layer as a Field within a Dataset uniquely identified and associated with the Block first responsible for providing information in such Dataset;

(2) on receipt of an Information Request specifying at least one Field, the Information Routing Layer operates to match each requested Field with a Proper Set comprising a corresponding Field (or Fields) selected from an available Dataset or Datasets.

In a multiple computer system, distinct information users and sources may be considered as "Blocks" in an integrated data network. Such "Blocks" may therefore comprise an individual computer or transducer or may comprise multiple devices or an entire local area network which can effectively function as an individual data user or source within the wider integrated data network. Depending upon circumstances, a Block may act as an information-providing or as an information-processing element, or as both.

Preferably, where one or more Blocks have an information processing capability to produce one or more specified output Fields when provided with one or more specified input Fields, this capability is recorded in the Information Routing Layer in the form of an Exchange Set for each Block with said capability specifying the input and the output Field(s) for each such Block, and the Information Routing Layer is adapted to form an Aggregate Set of one or more Fields from an available Dataset or Datasets with one or more of said Exchange Sets so as to enable the fulfilment of a specific Information Request.

An Information Routing Layer provides for the routing of information stored in the form of Datasets (combinations of field names, types, values and other components) from one Block to another by the process of "Information Routing", such that an existing Dataset can be provided or an Aggregate Set can be constructed using available Exchange Sets where appropriate to meet an Information Request from a Block in the integrated data network without programmatic or specified workflow reference to other Blocks. This latter feature, in particular, gives the present invention the advantages of straightforward scalability, resilience and generic applicability.

In a corresponding physical aspect, the invention provides an Information Router for facilitating the exchange and processing of information in and between a plurality of Blocks. Each Block is an information-providing or information-processing element in an integrated data network (and could generally include a District or any other defined data unit). At least one Block has a requirement to receive information from one or more other Blocks. The Information Router includes one or more computer processor(s) programmed to manage the exchange of information between Blocks and the fulfilment of a specific Information Request from a Block having a requirement to receive information. Each Block which can provide or process information on the network is registered by the Information Router. Each unit of information is handled by the Information Router as a Field within a Dataset uniquely identified and associated with the Block first responsible for providing information in such Dataset. On receipt of an Information Request specifying at least one Field, the Information Router will operate to match each requested Field with a Proper Set, which is a corresponding Field (or Fields) selected from an available Dataset or Datasets.

Preferably, where one or more Blocks has an information processing capability to produce one or more specified output Fields when provided with one or more specified input Fields, the Information Router is programmed to record such capability in the form of an Exchange Set for each Block with such capability specifying the input and the output Field(s) for each such Block, and in operation to form an Aggregate Set of one or more Fields from an available Dataset or Datasets with one or more of said Exchange Sets so as to enable the fulfilment of a specific Information Request.

The process of Information Routing for automating the integration of diverse electronic and computer components and systems, data users and sources may be performed by one or more specific hardware devices or a combination of hardware and software or by programmed instructions using conventional processors to perform "Information Router" functions. The principal function of the Information Routing Layer is to enable information from any Block to be made available to any other Block or to specified categories of other Blocks as appropriate.

The Information Routing Layer provides the facility for a Block to offer or convey information onto the network, to make requests for information, and to exchange new information in return for existing information.

Information Routing may take place at different levels in an integrated data network. For Blocks that belong to a particular bounded infrastructure (a "District"), such as a local data network, within which Information Routing is required, a single Information Router can act as the intermediary substrate (real or virtual) by which information is routed. On a wider network, Blocks may themselves belong to separate Districts. In this case, each District may have its own Information Routing Layer, with an additional link provided between the individual Districts to enable Information Routing at the District level.

Information Routing may be implemented on top of conventional data network protocols, such as TCP/IP with or without a separate message passing and queuing facility at the underlying Data Routing level. In a preferred embodiment of the present invention, Information Routing is implemented at the application Layer 7 of the OSI 7-layer data networking model.

DETAILED DESCRIPTION OF THE INVENTION

Figure 1:
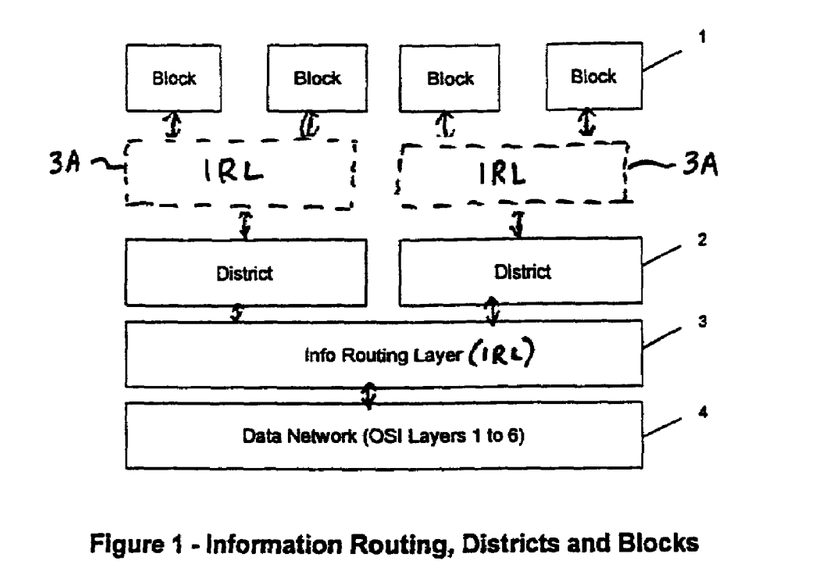
FIG. 1 is a block diagram illustrating the relative hierarchy of Data Routing level, Information Routing Level, Districts and Blocks in an integrated data network adapted to exploit the invention.

FIG. 1 illustrates key elements of an integrated data network embodying features according to the present invention. The integrated network is divided into Blocks 1, which represent individual information-processing or information-providing elements (users and/or sources of information), in the network. As such, each Block represents an individual computer, a local network, a transducer or a combination of such entities which can act or be treated as a unitary "Block" within the integrated data network. In FIG. 1, two Blocks in each case form a local District 2 and information is routed between Districts via the Information Routing Layer ("IRL") 3, which connects them for that purpose. All data connections among the Blocks 1, Districts 2 and IRL 3 are well-known wired or wireless connections. Additional Information Routing Layers 3A, shown in dashed lines, could also be provided at each District level to route information directly between Blocks in the same District. The Information Routing Layer 3 is preferably implemented in the application layer above the basic underlying data network-layers 4 in accord with the well-known OSI 7-layer model, where data is transferred using the conventional network protocols such as TCP-IP.

Figure 2:
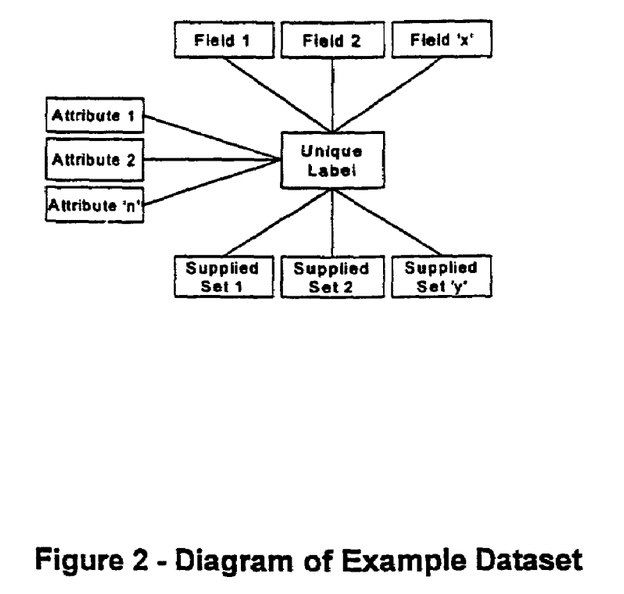
FIG. 2 is a block diagram showing elements included in an example Dataset.

In the embodiment illustrated, the Information Routing function is implemented at network application level (as an "Information Router") and allows collections ("Datasets") of units of information ("Fields") contributed by one or more applications, data users or sources ("Blocks"), to be formed in order to satisfy the requirements for inter-Block information sharing or exchange. FIG. 2 illustrates diagrammatically the typical elements which can be included within an example Dataset. Fields 1 to 'X' contain data which may be provided or processed by a Block. A Field is made up of at least an identifier ("Field Identifier") which will be unique within a Dataset, and a value ("Field Value"). The Field Value may be a traditional programmatic data type such as integer, float or string. It may also be a data type such as uniform resource locator, or a proprietary file format such as that for a commercial spreadsheet. A Field is always contained in a Dataset. A Dataset always has a unique label.

A Dataset will also normally have one or more "Attributes" which can be used by the Information Routing Layer for process management functions. Typically, "Attributes" may include the time of creation of the Dataset, an identifier of the Block which first provided the Dataset and an indicator if the Dataset is in an extant Aggregate Set. Additionally, the Dataset may include details of the Field(s) supplied in response to one or more Information Requests.

The Information Router provides a single programmatic interface for the benefit of participating Blocks via a programming library or similar facility. The Information Router supports the basic operations specified below which allow Blocks to make use of the Information Routing Layer for such purposes, in addition to conventional message queuing, publishing and subscription facilities.

A Block makes information available for access by other Blocks in the integrated data network via the Information Routing Layer by providing specified information in the form of a Field in a Dataset. A Block may create a new Dataset or add a new Field to an existing Dataset. The Information Routing function applies a unique label to each new Dataset, and no other Block is able to use this label. Once such a label is generated, it is possible for the same Block to add another Field which can be attached to the same Dataset using the unique label as identifier.

At any one time, therefore, there is a finite set of Fields associated with any extant Dataset. It is not possible to add a Field to a Dataset if the new Field has the same Field Identifier as an existing Field in that Dataset. This is because the set of all Fields in any Dataset can not contain duplicate Field Identifiers (i.e. it must be a "Proper" set). The Information Router keeps track of existing Datasets.

A Block which requires particular information can attempt to obtain such information, if available from a source on the integrated data network, by raising a uniquely labelled "Information Request" including a Proper Set of Field Identifiers corresponding to the information being sought (the "Information Request Set"). The Information Request also includes an Attribute, identified as the "Information Request Value", which can be used by the system to prioritise fulfilment of that Information Request. The "Information Request Value" may be allocated by the Block raising the Request or by the Information Router, or may be predetermined. Once a Request has been raised, it is held at the Information Routing Layer until fulfilment or expiry.

An Information Request is referred to as "Empty" until the specified Fields have been supplied via the Information Router. On submission of an Information Request, any existing Dataset that has the required Information Request Set may release a copy of that set of Fields via the Information Routing Layer.

The Information Router acts to ensure that regardless of how many existing Datasets may release the required Information Request Set, only one of these sets will be used to fulfil the Information Request. This operation is done in accordance with rules applied by the Information Router. Once an Information Request has been satisfied, the Fields in it can be made available to the Block that raised the Information Request via the Information Routing Layer. When this is done that Information Request is removed entirely from the system.

In addition to supplying or requesting information directly, a Block may have the capacity to process information and thereby be able to provide specified Output Information in exchange for particular Input Information.

If a Block has a capability to process information, it makes that capability known to other Blocks via the Information Routing Layer by raising a uniquely labelled "Exchange Set" which includes two Proper Sets of Field Identifiers (the "Input Set" and the "Output Set"). The union of the Input Set and the Output Set must itself be a Proper Set. The Exchange Set includes an Attribute known as the Exchange Cost. The Exchange Cost is used by the Information Router as a selection parameter to determine the priority to be given to completing a particular Exchange Set and/or to determining which Dataset(s) are selected to participate in a given Exchange Set transaction. The Dataset which supplies a specified Input Set will receive, in Exchange, the specified Output set.

Once an Exchange Set is created, any existing Dataset that holds the relevant Input Set may release a copy of that set of Fields via the Information Routing Layer. As for fulfilment of a direct Information Request, regardless of how many existing Datasets may be able to release the required Input Set, the Information Routing Layer ensures that only one of these will be used to supply the Exchange Set. The Information Router will only act to supply Input Sets to empty Exchange Sets. Additionally, the Information Router will not permit any supplying Dataset to include a Field which is specified in the Output Set of the Exchange Set. (Otherwise, if the Output Set includes a Field already in the Dataset, the result would not be a Proper Set.)

This supply of an Input Set is non-exclusive. For example, if a second Exchange Set exists with an identical Input Set, then a single existing Dataset holding that Input Set can satisfy both Exchange Sets. Again, because the supplying Dataset will receive the Output Set from both such Exchange Sets, it can only be permitted to supply both Input Sets if the union of the Output Set from each Exchange Set would be a Proper Set, that is, if there is no Field Identifier common to both Output Sets.

Once an Exchange Set holds the required Input Set, the Fields in it are made available to the Block that raised the Exchange Set. This same Block is then required to provide the specified Output Set of Fields into that Exchange Set. When the Exchange Set receives the Output Set, the Output Set Fields are attached to the original Dataset from which the Input Set was obtained and the Input Set Fields in the Exchange Set are emptied.

The net effect of this process is that the original supplying Dataset increases, or aggregates, its set of Fields via the addition of those in the Output Set. The Exchange Set then reverts to its original empty state. This means that the Exchange Set is once more made available for use by the Information Router. By following this process, the Information Router can selectively create aggregated Dataset(s) to meet Information Requests which cannot otherwise be met directly from an original Dataset.

Figure 3:
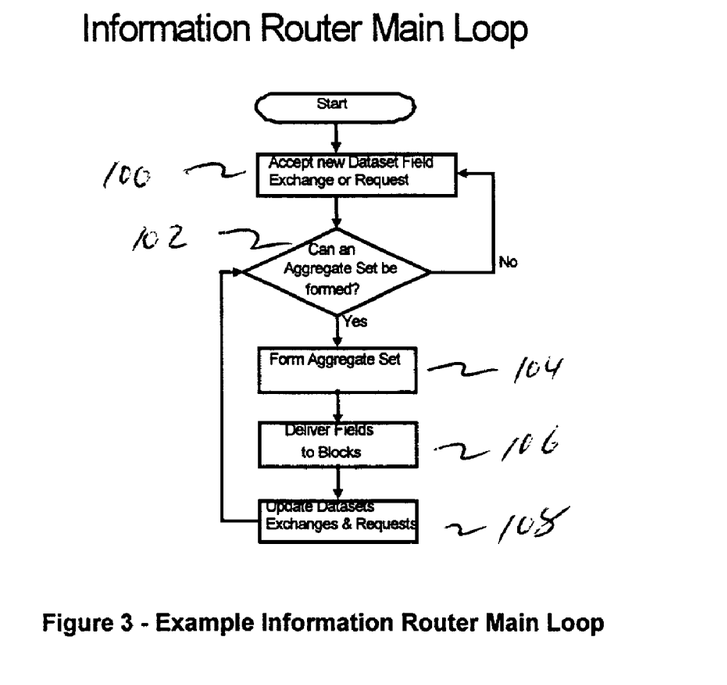
FIG. 3 is a flow chart showing the basic processes involved in Information Routing according to the invention.

FIG. 3 is a flow chart illustrating the basic steps taken by the Information Router in the process of aggregation by matching Datasets with Exchange Sets and Information Requests. When an Information Request (or data exchange) is accepted in step 100, then the IRL decides whether an Aggregate Set can be formed in step 102. If so, then the Aggregate Set is formed in step 104. The combination of a Dataset, and a collection of zero or more Exchange Sets whose Output Sets form a Proper Set matching at least one Information Request is referred to as an Aggregate Set. The Information Router may use any appropriate selection technique to form such a combination. For example, any appropriate known search algorithm may be used to identify the optimal original Dataset which when combined with zero or more Exchange Sets will form an Aggregate Set satisfying one or more Information Requests. The appropriate Fields are delivered to blocks in step 106. Finally, the status of all datasets is updated in step 108.

Figure 4:
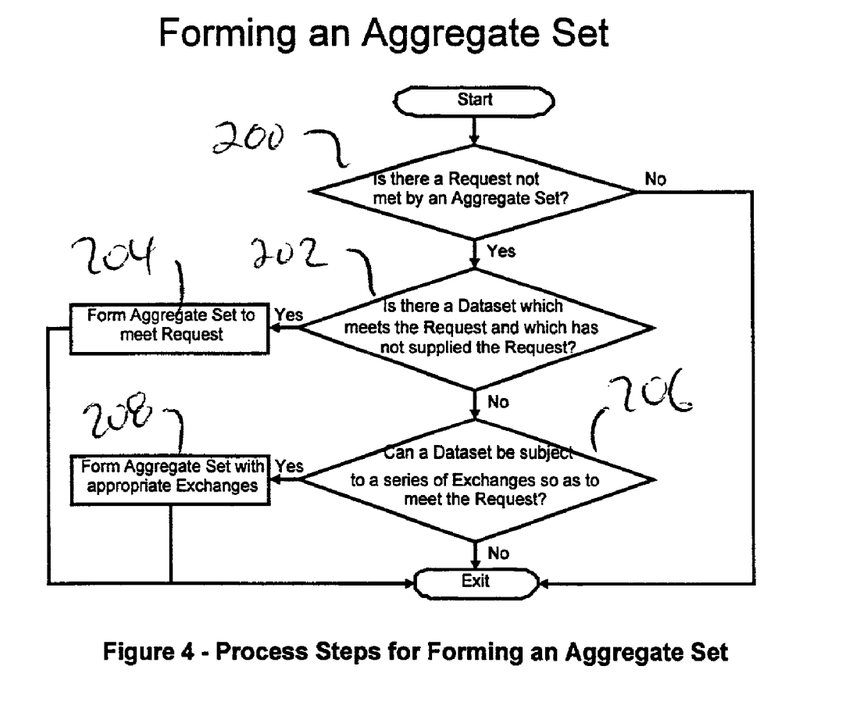
FIG. 4 is a flow chart showing the processes involved in the formation of an aggregated Dataset.

FIG. 4 is a flow chart of the principal process steps for producing an Aggregate Set from a Dataset and using one or more Exchange Set to meet a specified Information Request. Step 200 evaluates whether there is an outstanding Information Request which has not been met by an Aggregate Set. If so, then the IRL reviews its store of Datasets in step 202 to see if one meets the Request but has not supplied the requested set of Fields. If so, then the IRL causes the Aggregate Set to be formed in step 204 and delivered as above. If not, then the IRL further evaluates in step 206 whether a Dataset could be subjected to a series of Exchanges in order the meet the Request. If so, then the IRL causes the appropriate Exchanges to be executed in order to form the Aggregate in step 208.

The Information Router may cause many Aggregate Sets to form simultaneously in the Information Routing Layer within a District.

The Information Router uses the specified Information Request Value and Exchange Set Cost(s) to determine whether a particular Request can or should be fulfilled appropriately by possible Exchanges. The Information Request Value and Exchange Set Cost(s) may be representative of monetary costs or other measures of a critical resource, such as processor time or memory utilisation, which are relevant limiting factors in most circumstances. The Information Router uses these parameters (Attributes) to make operational decisions whether or not an Information Request can be met effectively within the applicable resource constraints.

Basically, the determining factor is that the total Exchange Set Costs in creating an Aggregate Set should not exceed the total Information Request Value(s) of the Information Request(s) which can be met by corresponding Aggregate Sets.

The sum of the Exchange Set Costs required to enable any given Dataset to satisfy any given Information Request is referred to as the Aggregate Cost. If the Aggregate Cost of a possible aggregation of Exchanges ("Exchange Route") is greater than the Information Request Value, then that Exchange Route can be discarded as ineligible. If the Aggregate Cost for one Dataset is lower than that for a different Dataset, then the one Dataset will be preferred by the Information Router as the starting point for a Aggregate Set. If one Aggregate Set satisfies several different Information Requests, then that Aggregate Set will be preferred by the Information Router rather than having two or more separate Aggregate Sets satisfy those Information Requests, provided the Aggregate Cost of the one is less than the sum of the separate Aggregate Sets.

If one Aggregate Set can satisfy one of several Information Requests with identical Information Request Sets, then the Information Router can prioritise on the basis of maximising the margin between Value and Costs and act to satisfy first the Information Request whose Information Request Value less the corresponding Aggregate Cost is greatest.

In the present example, the Values and Costs have been treated as Attributes of the Information Request and Exchange Sets respectively. It will be apparent that the respective "values" or "costs" of fulfilling an Information Request could be predetermined or otherwise set by or for the Information Router, so that the Information Router might alternatively operate either by comparing an "Information Request Value" against (pre-)set costs or by comparing "Exchange Set Costs" against (pre-)set values.

The Information Router is able to maintain a history of the elapsed time between the Input Set of a Exchange Set being collected, and the Output Set of the Exchange Set being produced. If one Block historically completes its associated Exchange Set more quickly than another, then this Exchange Set may be preferred by the Information Router over another Exchange Set (or Sets) which could be aggregated to meet a particular Information Request.

The Information Routing Layer can impose a lifetime on Datasets, which may differ from District to District. For example, in a District supporting, say, a Computer Telephony system, a lifetime of a few minutes may be appropriate, whereas in a District dealing with historical customer records, a lifetime may be just that. Any Dataset older than its appropriate lifetime is "Expired". An Expired Dataset will no longer be available from the Information Routing Layer.

Any Dataset which has supplied all possible Proper subsets of the Fields attached to the Dataset is deemed "Expended". For example, a Dataset holding just one Field is expended as soon as that Field satisfies an Information Request. An Expended Dataset is removed entirely from the Information Routing Layer. It follows that any other Information Request requiring the same Information Request Set can only have its request satisfied by another Dataset, if at all, and that any one Dataset (not being part of an active Aggregate Set) may satisfy not more than $N(N+1)/2$ Information Requests, where 'N' is the number of Fields in the Dataset. No Dataset can be Expired or Expended if it is part of an extant Aggregate Set.

A Block that has raised any Dataset, Information Request or Exchange Set can shatter it at any time by invoking a "Shatter" operation using the Dataset's unique label. This may be done, for example, if the originating Block determines that the Dataset, Information Request or Exchange Set has been superseded or that one or more Fields are no longer valid. A Shattered Dataset, Information Request or Exchange Set will no longer be available from the Information Routing Layer.

If a Block that has raised an Information Request or an Exchange Set becomes disconnected from the Information Routing Layer for any reason, the Information Router may remove the consequent "Orphaned" Information Requests and Exchange Sets raised by that Block from the system regardless of the status of any Aggregate Sets comprising the relevant Exchange Sets or created to meet the relevant Information Requests.

An application of the present invention in the practical situation of a miniature alt "call centre" with two staff will now be described with reference to FIGS. 5–8 to demonstrate how the Information Routing functionality can bring three major advantages to a common integration problem faced by many organisations: (i) rapid, cheap "proof of concept" of an overall solution using simulation; (ii) development of separated Blocks of functionality that neither communicate directly nor participate in a workflow that each Block (and therefore its programming team) needs to be aware of; and (iii) the ability to add new business functionality without in any way changing or impacting on existing Blocks.

Figure 5:
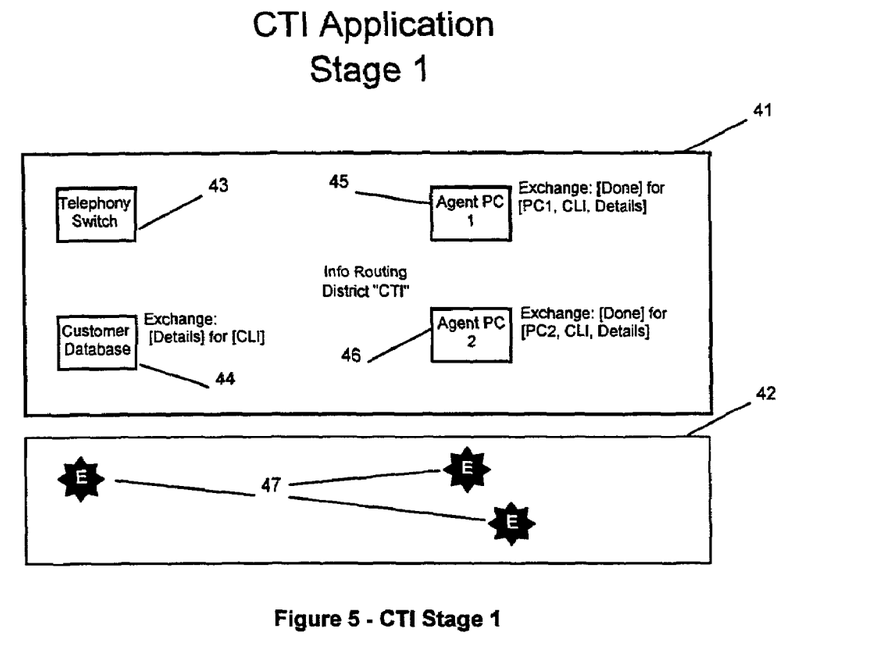
FIGS. 5 to 8 illustrate the principal stages in application of the present invention to a telephone call-centre environment.

FIG. 5 is a block diagram of a single "District" 41 comprising four Blocks 43, 44, 45, 46, functionally overlying an Information Router/information Routing Layer 42. Block 43 is a Telephony Switch—this is the hardware into which the outside telephone lines are connected and to which all the call centre staff ("Agents") are connected via a telephone handset in the usual manner. Block 44 is the Customer Database—this is the records system, which is able to look up and output customer details upon being given the telephone number from which the caller is ringing (using "CLI" or Caller Line Identification). Blocks 45 and 46 are Two Agent workstations—these are the PCs or terminals (separate from the telephone handsets) in front of which the Agents are seated.

In the Information Routing Layer 42, three Exchange Sets 47 have been raised, one each by the Customer Database and the two Agent PC applications. These Exchange Sets are indicative of the information processing capabilities of the respective Blocks. As yet, no Datasets exist in the Information Routing Layer, nor any Information Requests.

Figure 6:
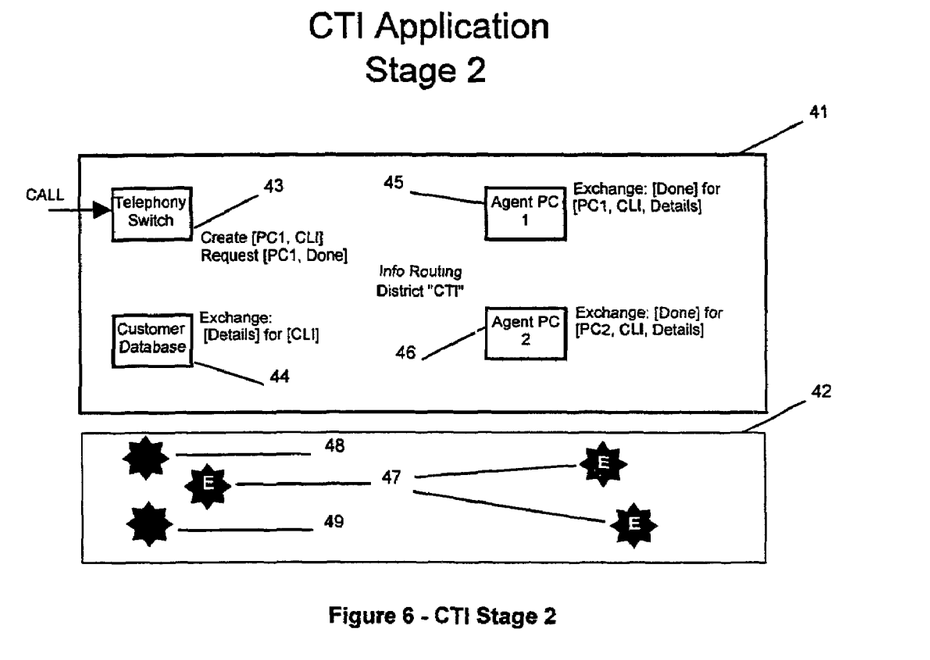

FIG. 6 shows diagrammatically the changes which occur when a call arrives at the Telephony Switch 43. The Telephony Switch 43 knows both the inward number dialled and the number from which the call originated (using Calling Line Identification 15 CLI) and is able to create a new Dataset 48 initially comprising two Fields, having Field Identifiers "PC1" and "CLI" respectively, in the Information Routing Layer 42.

In conjunction with the creation of this Dataset 48, the Telephony Switch 43 also raises an Information Request 49 with a corresponding Information Request Set comprising the Field Identifiers "PC1" and "Done". This is essentially a request for confirmation that the new incoming call has been dealt with. Initially, this Information Request 49 cannot be satisfied, because no Dataset exists with both a "PC1" Field and a "Done" Field. However, once the Request 49 has been submitted and is pending response in the Information Routing Layer 42, the Telephony Switch 43 has no need to wait until a response is received, but is immediately freed to handle another incoming call should one arrive.

Figure 7:
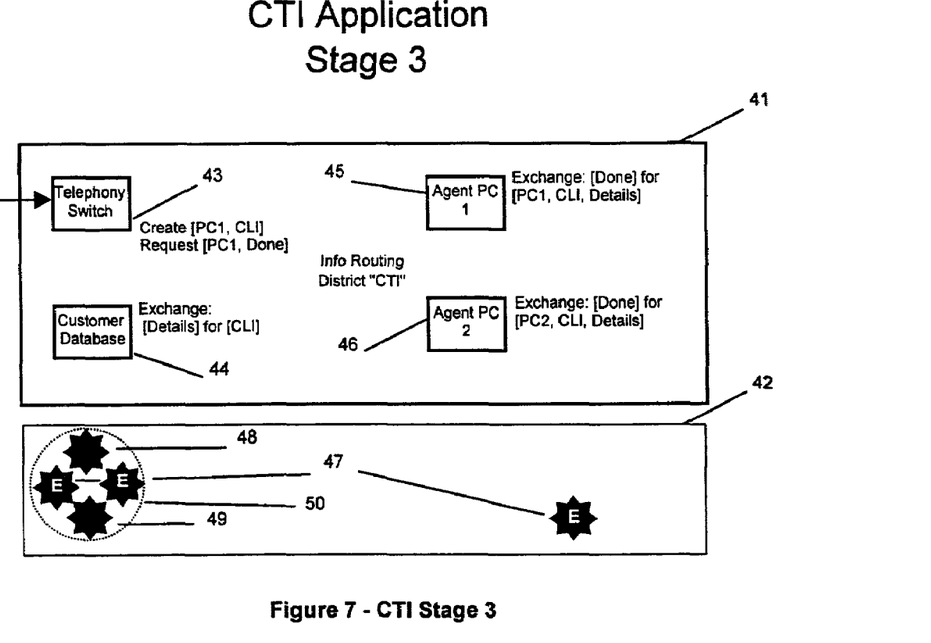

There are then five Information Sets of various forms available for interaction via the Information Routing Layer. FIG. 7 illustrates how the Information Router handles these Sets. Firstly, the Information Router 42 determines that the Information Request 49 raised by the Telephony Switch 43 can be satisfied if the Dataset 48 originally raised by the same Block 43 is matched up with two of the Exchange Sets 47—one which delivers the "Details" Field as its Output Set (from the Database 44) and another one which delivers the "Done" Field as its Output Set (e.g. from Agent PC1, Block 45).

The origins of the various Sets are unimportant as far as the Information Router is concerned. Its objective is simply to find an effective aggregation to meet any pending Information Request. In the case shown in FIG. 7, the Information Router 42 has chosen to aggregate two Exchange Sets 47 and the Dataset 48 with the Request 49 forming an Aggregate Set 50.

The Information Router proceeds with the following steps:

(i) the "CLI" Field is sent to the Customer Database 44, which responds with the customer "Details" Field which is then attached to the relevant Exchange Set 47.

(ii) as this Field makes up the entire Output Set in that Exchange Set, the Information Router 42 moves the Output Set into the Dataset 48 and the Input Set is cleared from that Exchange Set 47, leaving it empty once more. This means that the Customer Database 44 is immediately able to provide another set of "Details" for exchange when the next call arrives.

(iii) the "PC1", "Details" and "CLI" Fields are now available from the Dataset 48 for the Agent PC1.

(iv) The Agent PCl (Block 45) now has all the information required properly to conduct the call with the customer. The Agent PCl can take as long as it likes to raise the "Done" Field once it is in receipt of its specified Input Set [PC1,CLI, Details]—this corresponds to the Agent's telephone conversation taking as long as necessary.

(v) When the call finishes, the Agent PC1 enters the "Done" Field into its Exchange Set 47.

(vi) Since this Field makes up the entire Output Set, the Information Router 42 transfers the Output Set into the Dataset 48 and the Input Set information is cleared from the Exchange Set, leaving it Empty once more. This means that the Agent PCl is immediately able to take and complete a new call using its Exchange Set to record the relevant information.

(vii) The "PC1" and "Done" Fields are now available to satisfy the Information Request 49 originally raised by the Telephony Switch 43.

(viii) Upon receipt of that satisfied Information Request 49, the Telephony Switch 43 is able to close down the call to Agent PC1. The satisfied Information Request 49, having been delivered to the Block 43 that raised it, is also removed entirely from the Information Routing Layer 42.

Figure 8:
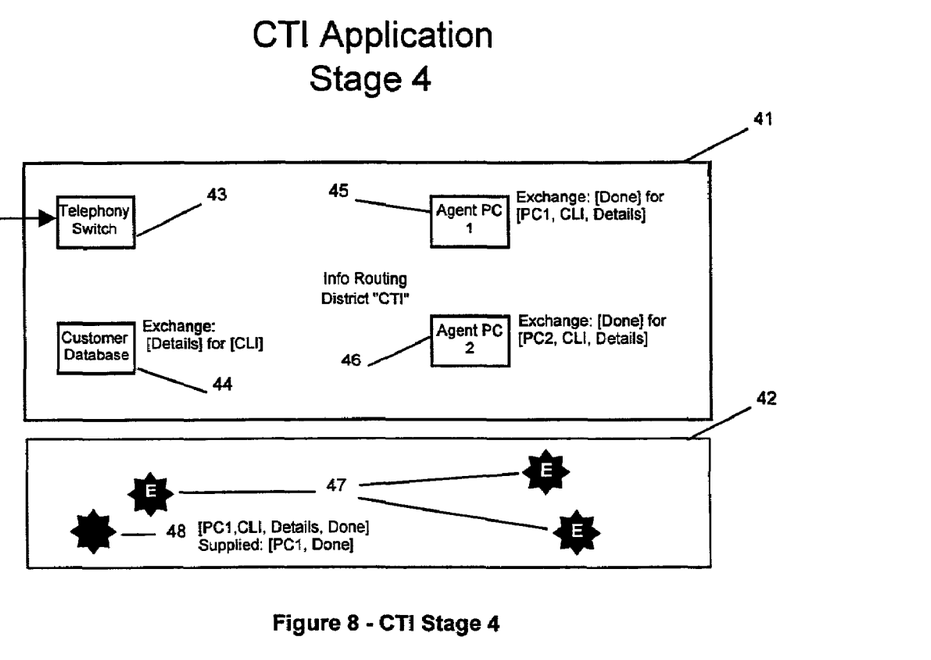

The Information Router 42 has now done its work and, as illustrated in FIG. 8, the Information Routing Layer contains the original Exchange Sets in the same Empty state as in Stage 1 (FIG. 5) with the addition of a Dataset 48, which has supplied an Information Request Set comprising the "PC1" Field and the "Done" Field. This Dataset 48 is not permitted to supply a further Information Request Set with the information in any Field already supplied in response to an identical, previous Information Request 49, so the continued availability of this Dataset 48 for other potential uses does not impact the handling of future calls. It may be that the Dataset 48 will expire (if this option is enabled within the Information Router 42).

It is important to note that at no time is the order of operations (or "workflow") specified, nor is it necessary to program for specific interactions between Blocks in the integrated data network. The Information Router 42 simply takes the information available from the various independent Blocks and allocates or distributes that information to meet Information Requests from a Block. In a real-life environment (such as a call centre with hundreds of lines), using current processing technology, the Information Router can readily process multiple Information Requests and perform many aggregations simultaneously. No Block itself need even be aware of the existence of any other particular Block. This is a significant advantage of the present invention, which enhances system flexibility.

Figure 9:
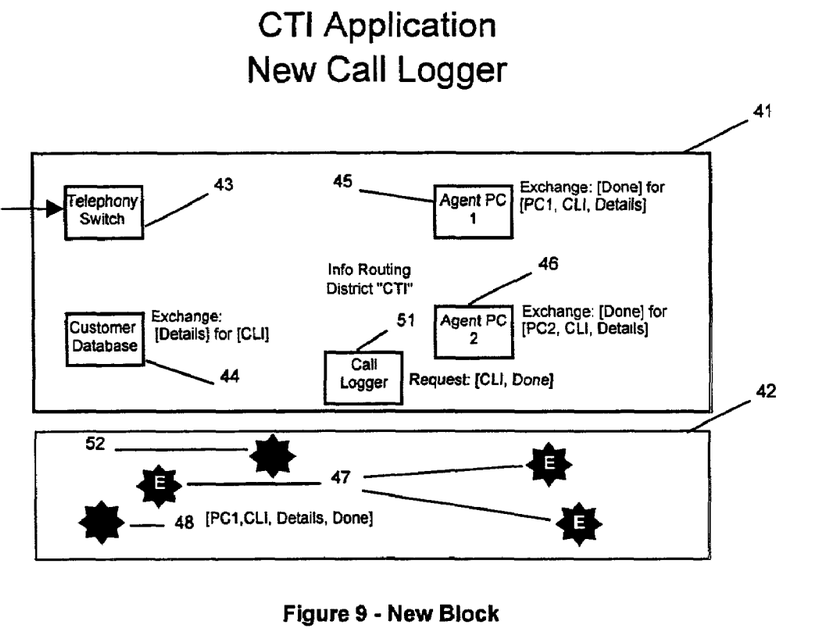
FIGS. 9 and 10 illustrate how the application of the invention as used in the callcentre example can automatically adapt to the addition of a new information processing Block (a Call Logger) to the data network in that example.
Figure 10:
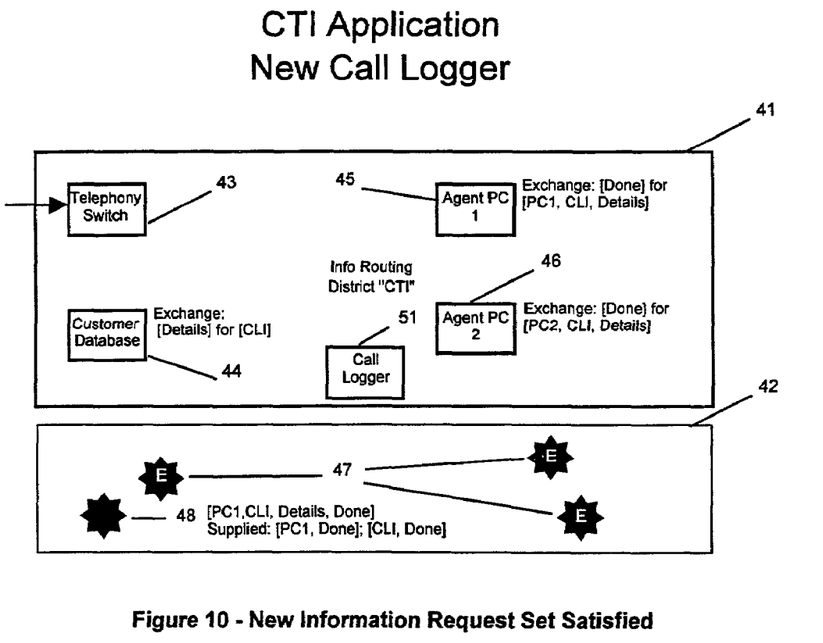

This flexibility is demonstrated in the example illustrated in FIGS. 9 and 10, which illustrate how the District 41 from the previous example can bear the addition of a new Call Logging Facility 51 without any changes whatever to the existing Blocks. This provides considerable potential for savings in the time and cost of implementation over existing methods and systems.

In FIG. 9 a new Block 51, a Call Logger, has been added to log completed calls. It makes this function known to the Information Router 42 by raising an Information Request 52 requesting the "CLI" Field and the "Done" Field. Whenever this Information Request 52 is satisfied and the requested information is delivered by the Information Routing Layer 42 to the Call Logger 51, it stores the information in its Call Log database and will then raise a new Information Request. In the present example, as shown in FIG. 10, the Information Router 42 recognises that the initial Information Request 52 from the Call Logger 51 can be met by supplying the "CLI" and "Done" Fields from the currently available Dataset 48, which has not previously been used in response to such an Information Request.

The Call Logger 51 can therefore operate at its own rate, fast or slow, without affecting its ability to log all the calls that occur - this is because even if new Datasets with new "CLI" and "Done" Fields are raised faster than the Call Logger 51 can gather the relevant information with new Information Requests, the Information Routing Layer 42 will simply deliver that information from each new Dataset as and when a new Information Request is raised.

It will be apparent that the Information Routing Layer according to the present invention may be implemented by distributed components of hardware and software or by a single device depending upon suitability for any particular application. The Fields, Attributes and supplied sets associated with a Dataset may therefore be held within a single device or distributed amongst more than one. This applies also to the storage and processing associated with Information Requests and Exchange Sets.

The invention claimed is:

1. An information routing system for an integrated data network, comprising a plurality of blocks each coupled to an information router,
   wherein each block is a functional element in an integrated data network,
   wherein each block is registered in the information router,
   wherein at least one of the blocks is registered as an information-processing element capable of producing at least one output field when provided with at least one input field,
   wherein the information router is programmed to register such capability in the form of an exchange dataset for each block with such capability specifying the input and the output fields for each such block,
   wherein at least one of the blocks issues an information request, and
   wherein the information router operates to form an aggregate dataset of at least one field from an available dataset and at least one exchange dataset so as to enable the fulfilment of the information request.

2. An information routing system as in claim 1, wherein the information router processes each unit of information it handles as a field within a dataset, and wherein the dataset is uniquely identified and associated with the click first responsible for providing a field, and whereby on receipt of the formation request including a field identifier, the information router operates to match a requested field with a proper dataset having at least one field corresponding to the requested field and selected from an available dataset.

3. An information routing as in claim 1, wherein the information router process each unit of information it handles as a field with a dataset, and wherein the dataset is uniquely identified and associated with the block first responsible for providing a field, and whereby on receipt of the information request including a field identifier, the information router operates to match a requested field with a proper dataset having at least one field corresponding to the requested field and selected from a newly created dataset.

4. An information routing system as in claim 1, wherein at least one of the blocks is an information-providing element capable of providing a dataset comprising at least one field, and wherein the information router operates to form an aggregate dataset of the at least one field from the said dataset and at least one field from another dataset so as to enable the fulfilment of the information request.

5. An information routing system as in claim 4, wherein the aggregate dataset is obtained by forming at least one new dataset.

6. An information routing system as in claim 4, wherein the aggregate dataset is obtained by using an existing dataset.

7. An information routing system as in claim 1, wherein the information request includes a unique identifier and attributes which are used to prioritize the fulfilment of information requests in the information router.

8. An information routing system for an integrated data network, comprising
   a plurality of blocks each coupled to an information router,
   wherein at least one of the blocks issues an information request, and wherein the information router is adapted to fulfil the information request by forming and exchanging a proper dataset on the basis of information about the blocks: as registered in the information router, and
   wherein each block is a functional element in an integrated data network and is registered in the information router, and wherein at least one of the blocks is registered as an information-processing element capable of producing at least one output field when provided with at least one input field, and wherein the information router is programmed to register such capability in the form of an exchange dataset for each block with such capability specifying the input and the output fields for each such block, and wherein at least one of the blocks is capable of functioning as an information-providing element capable of providing a dataset comprising at least one field, and
   wherein the information router operates to form an aggregate dataset of the at least one field from the said dataset and at least, one exchange dataset so as to enable the fulfilment of the information request.

9. A method of facilitating the exchange and processing of information between a plurality of blocks, wherein each block is a functional element in an integrated data network,
   providing an information router coupled to each of the blocks, comprising at least one computer processor programmed to manage an exchange of at least one unit of information between the blocks in order to fulfil information requests issued by the blocks, wherein the information router processes each unit of information it handles as a field within a dataset which is uniquely identified and associated with the block first responsible for providing a field,
   registering each block in the information router, some of the blocks being capable of functioning as information-providing elements and some of the blocks being registered as information-processing elements, and
   at least one of the blocks issuing an information request based on its requirement to receive information from at least one other block,
   the information router operating to match a requested field with a proper data set having at least one field corresponding to the requested field and selected from an available dataset.

10. A method of facilitating the exchange and processing of information between a plurality of blocks, wherein each of the blocks is a functional element in an integrated data network, comprising:
    providing an information router coupled to each of the blocks;
    registering each of the blocks in the information router, some of the blocks being registered as information-processing elements; and
    at least one of the blocks issuing an information request including a field identifier;
    wherein at least one of the blocks is registered as an information-processing element capable of producing at least one output field when provided with at least one input field,
    wherein the information router is programmed to register such capability in the form of an exchange dataset for each block with such capability specifying the input and the output fields for each such block, and wherein the information router operates to form an aggregate dataset of at least one field from an available dataset and at least one exchange dataset so as to enable the fulfilment of the information request.

11. A method as in claim 10, wherein each block is registered in the information router, and wherein at least one of the blocks is capable of functioning as an information-providing element capable of providing a dataset comprising at least one field, and wherein the information router operates to form an aggregate dataset of the at least one field from the said dataset and at least one exchange dataset so as to enable the fulfilment of the information request.

12. A method as in claim 10, wherein the information request includes a unique identifier and attributes which are used to prioritize the fulfilment of information requests in the information router.

13. An information routing system, comprising:

a plurality of blocks and an information router coupled to the blocks, wherein each block is a functional element in an integrated data network, and wherein at least one of the blocks issues an information request based on its requirement to receive units of information from at least one other block, and wherein each block is registered in the information router, some of the blocks being capable of functioning as information-providing elements and some of the blocks being registered as information-processing elements, and wherein at least one block is an information-processing element capable of producing at least one output field when provided with at least one input field, and wherein the information router is programmed to record such capability in the form of an exchange dataset for each block with such capability specifying the input and the output fields for each such block, and wherein the information router comprises at least one computer processor programmed to manage an exchange of at least one unit of information between the blocks in order to fulfil the information request, wherein the information router processes each unit of information it handles as a field within a dataset which is uniquely identified and associated with the block first responsible for providing a field, and wherein the information router operates to form an aggregate dataset of at least one field from an available dataset and at least one exchange dataset so as to enable the fulfilment of the information request, and whereby on receipt of the information request, the information router operates to match a requested field with a proper data set having at least one field corresponding to the requested field and selected from an available dataset.

14. An information routing system as in claim 13, wherein at least one block is an information-providing element capable of providing a dataset comprising at least one field, and wherein the information router operates to form an aggregate dataset of the at least one field from the said dataset and at least one field from another dataset so as to enable the fulfilment of the information request.

15. An information routing system as in claim 13, wherein each information request specifies an information request value, and wherein the information router uses the information request value as a factor in determining whether to fulfil the information request.

16. An information routing system as in claim 13, wherein each exchange dataset specifies an exchange dataset cost, and wherein the information router uses the exchange dataset cost as a factor in determining whether to fulfil the information request.

* * * * *